March 11, 1924.  1,486,236

W. G. FISHER

TRACTOR WHEEL

Filed June 19, 1922  2 Sheets-Sheet 1

Inventor:
W. G. FISHER.
By Fetherstonhaugh & Co.
Attys.

March 11, 1924.

W. G. FISHER

TRACTOR WHEEL

Filed June 19, 1922    2 Sheets-Sheet 2

1,486,236

Inventor,
W. G. FISHER.
By Fetherstonhaugh&Co.
Attys.

Patented Mar. 11, 1924.

1,486,236

UNITED STATES PATENT OFFICE.

WALTER GEORGE FISHER, OF ORANGEVILLE, ONTARIO, CANADA.

TRACTOR WHEEL.

Application filed June 19, 1922. Serial No. 569,205.

*To all whom it may concern:*

Be it known that I, WALTER GEORGE FISHER, a subject of the King of Great Britain, and a resident of the town of Orangeville, in the county of Dufferin, in the Province of Ontario, Canada, have invented certain new and useful Improvements in Tractor Wheels, of which the following is the specification.

My invention relates to improvements in tractor wheels of the type in which tread plates carried by the wheel are automatically laid in longitudinal series to form a track bed upon which the wheel travels and the object of the invention is to simplify the construction, to prevent any binding between the parts, and assure of the tread plates being laid with an even movement as they are placed end to end and it consists essentially of the following arrangement and construction of parts as hereinafter more particularly explained.

In the drawings like characters of reference indicate corresponding parts in each figure.

Figure 1:
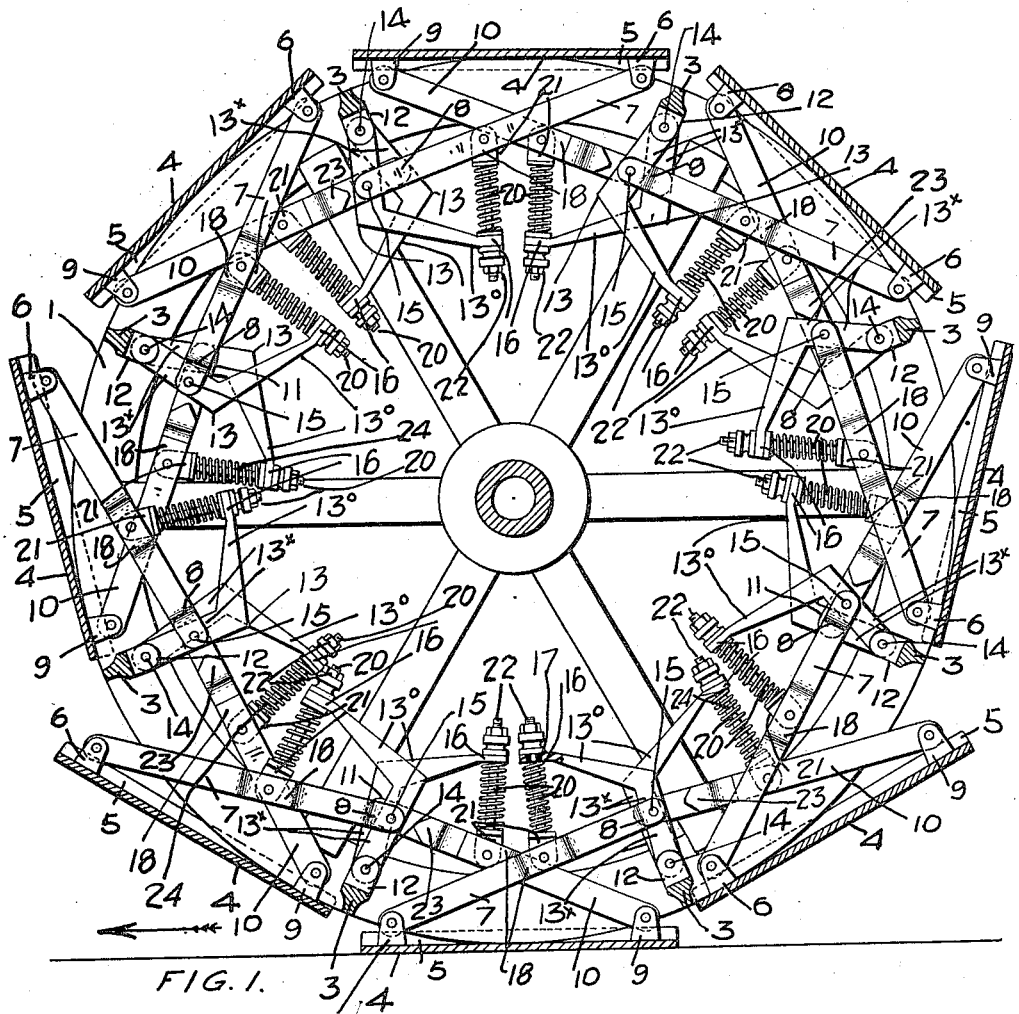
Fig. 1 is a sectional view through my wheel showing the wheel supported directly upon one of the tread plates.
Figure 3:
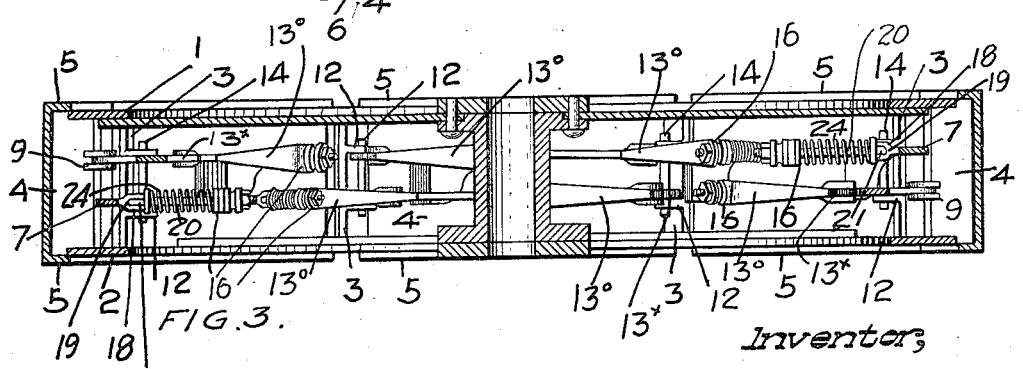
Fig. 3 is a plan sectional view through the centre of Fig. 1.

1 and 2 indicate skeleton wheels, equally spaced apart by cross bars 3 which are bracketed or otherwise suitably secured to the wheel members 1 and 2. 4 are tread plates provided with flanges 5 extending along their longitudinal edges. The tread plates 4 are located between each pair of cross bars 3. 6 are lugs extending upward from one end of each tread plate between which is swung a lever 7. The lever 7 extends longitudinally of the plate and is provided at its opposite end with a jaw 8.

It will be noted that the lugs 6 located at one end of each tread plate are in circumferential alignment. 9 are lugs located at the opposite end of each tread plate and offset slightly laterally in relation to the lugs 6. 10 are levers pivoted between the lugs 9 and arranged in criss-cross position in relation to the levers 7. The levers 10 are also provided with jawed ends indicated by the numeral 11.

12 are lugs extending inward from each cross bar 3. 13 are levers which are obtuse angular in form, one arm 13ˣ of each lever being pivoted between the jaws of the lugs 12 as indicated at 14. A lever 13 is pivoted intermediately of its length in each of the jaws 8 and 11 of each lever 7 and 10, respectively, as indicated at 15. The other arm 13° of each lever 13 inclines normally slightly upward from the arm 13ˣ and terminating in a normally horizontal portion 16 having an orifice 17 therein. Each of the levers 7 and 10 is provided in its central portion with an enlargement 18 in which is formed a longitudinal slot 19. 20 is a bolt provided with an enlarged flattened end 21 extending into the slot 19.

The upper end of the bolt 20 extends through the orifice 17 in the portion 16 and is provided at its extreme upper end with a threaded portion upon which is screwed a securing nut 22. 23 is a stop projection extending from each lever 7 to engage with the opposing edge of the arm 13ˣ of the lever 13 as will hereinafter appear.

When one of the tread plates 4 is upon the ground and the wheel located centrally thereof the parts are arranged in the position indicated in Fig. 1.

Figure 2:
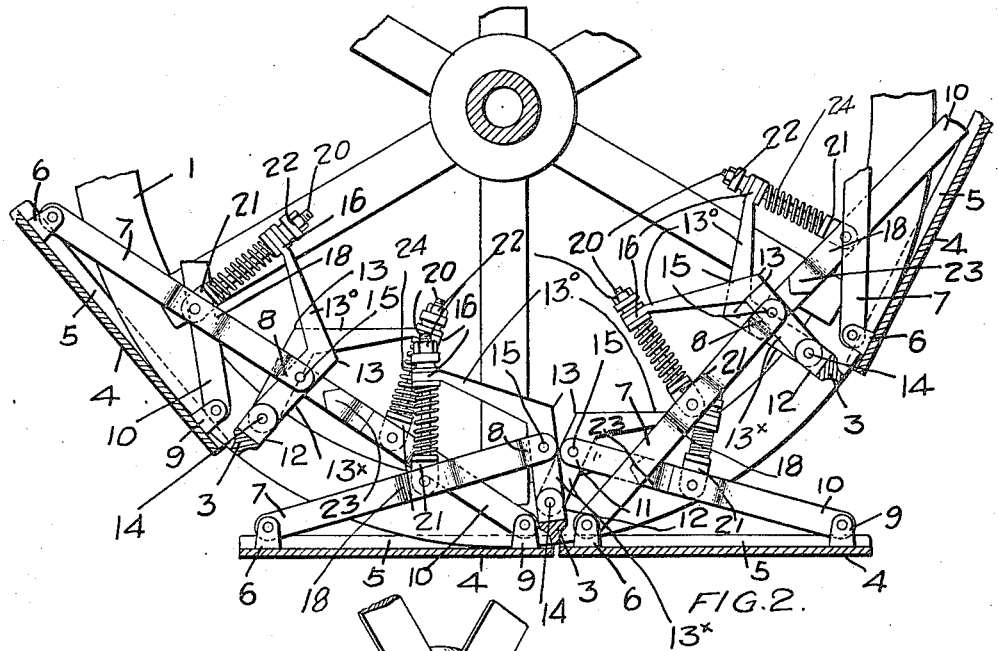
Fig. 2 is a similar view of the lower portion of the wheel showing the position of the parts of the wheel after passing from one tread plate to another.
Figure 4:
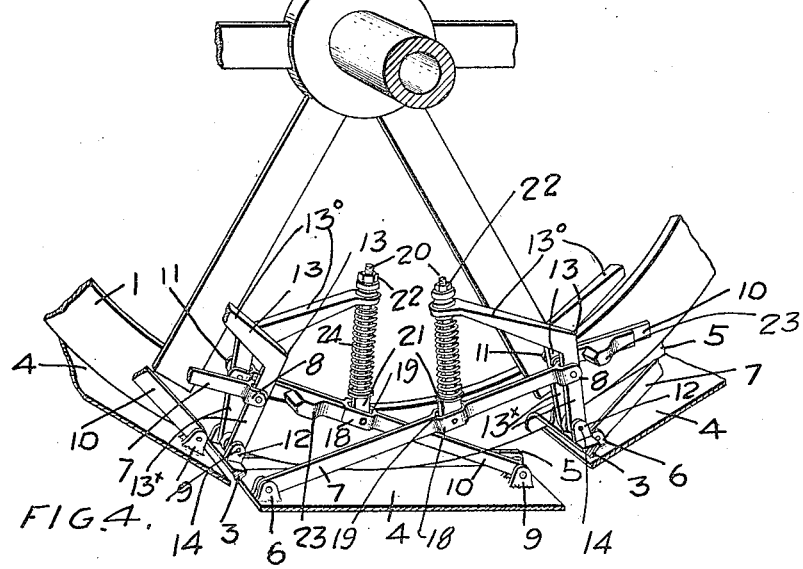
Fig. 4 is a sectional perspective detail of a fragmentary portion of my wheel.

As the wheel travels in the direction of arrow such wheel travels over the upper surface of the tread plate onto the surface of the next adjacent tread plate or to the position shown in Fig. 2, the next succeeding tread plate 4 having been carried down to a horizontal position to contact with the surface of the ground so as to be placed end to end with the aforesaid tread plate.

As the wheel travels over any one of the tread plates the lever 7 of the forward plate 4 (see Fig. 2) having ground contact tends to swing the lever 13 rearward permitting the spring 24 to expand to the fullest extent. This movement is, however, compensated for by the forward travel of the wheel. At the same time the lever 10 carried by the plate 4 having ground contact and at the rear of the aforesaid plate 4 draws the corresponding reversely set lever 13 also rearward compressing the spring 24 thereof and overcoming any tendency of the parts to bind. When the wheel travels in the opposite direction the levers 7 and 10 operate reversely so that the lever 7 compresses its spring 24 and the lever 10 tends to permit the expansion of its corresponding spring.

As the plates 4 are carried down to the operative position it has been found that there is a tendency for the lower end of the plate to swing outward from the periphery of the wheel instead of hugging the wheel closely so as to pass easily into position beneath the wheel. In order to limit this movement the stops 23 are provided and with which the levers contact preventing any excessive outward movement of the lower end of the plate 4 causing the plate to engage endwise with the ground.

As each tread plate 4 descends the stops 23 engage the back edge of each lever 13 to support the tread plate in the correct angular position so that it will readily fall outward to assume the horizontal position upon the ground when brought into contact therewith.

From this description it will be seen that I have devised a very simple form of tractor wheel in which tread plates will be carried successively into position on the surface of the ground with an even and free movement so that there will be no binding of the parts.

What I claim as my invention is:

1. A tractor wheel comprising two wheel members, spaced apart, cross bars connecting the wheel members together and spaced suitable distances apart around the periphery of the wheel, tread plates located between each pair of bars, criss-cross levers pivotally mounted at each end of the tread plate, an angular lever pivotally connected to each cross bar and intermediately of its length to one of the aforesaid levers, and a yieldable connection between the opposite or outer end of the angular lever and the aforesaid criss-cross lever.

2. A tractor wheel comprising two wheel members, spaced apart, cross bars connecting the wheel members together and spaced suitable distances apart around the periphery of the wheel, tread plates located between each pair of bars, criss-cross levers pivotally mounted at each end of the tread plate, an angular lever pivotally connected to each cross bar and intermediately of its length to one of the aforesaid levers, a yieldable connection between the opposite or outer end of the angular lever and the aforesaid criss-cross lever, and a stop projection carried by one of each pair of criss-cross levers adapted to engage the lever mechanism of the next succeeding plate to limit its movement as the plate travels into contact with the ground.

WALTER GEORGE FISHER.